United States Patent
Howard et al.

(10) Patent No.: US 7,911,174 B1
(45) Date of Patent: Mar. 22, 2011

(54) POSITION SENSING FOR ROTOR IN HYBRID STEPPER MOTOR

(75) Inventors: David E. Howard, Hazel Green, AL (US); Dean C. Alhorn, Huntsville, AL (US); Dennis A. Smith, Athens, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 332 days.

(21) Appl. No.: 12/039,506

(22) Filed: Feb. 28, 2008

(51) Int. Cl.
*G05B 19/40* (2006.01)

(52) U.S. Cl. ......... 318/685; 318/696; 318/648; 318/649

(58) Field of Classification Search ............... 318/685, 318/696, 648, 649
See application file for complete search history.

(56) References Cited

U.S. PATENT DOCUMENTS

| | | | |
|---|---|---|---|
| 5,378,975 A | 1/1995 | Schweid et al. | |
| 5,912,541 A | 6/1999 | Bigler et al. | |
| 5,990,651 A * | 11/1999 | Iwazawa et al. | 318/685 |
| 6,013,999 A | 1/2000 | Howard et al. | |
| 6,037,735 A | 3/2000 | Janosky et al. | |
| 6,051,943 A | 4/2000 | Rabin et al. | |
| 6,124,651 A * | 9/2000 | Yoshimura et al. | 310/49.34 |
| 6,359,406 B1 * | 3/2002 | Chiu et al. | 318/400.38 |
| 5,912,541 C1 | 6/2002 | Bigler et al. | |
| 6,437,526 B1 * | 8/2002 | Derouane et al. | 318/400.23 |
| 6,522,130 B1 * | 2/2003 | Lutz | 324/207.2 |
| 6,552,453 B2 * | 4/2003 | Ohiwa et al. | 310/68 B |
| 6,611,072 B1 | 8/2003 | Ellerthorpe et al. | |
| 7,075,196 B1 | 7/2006 | Labriola, II | |
| 7,081,730 B1 | 7/2006 | Howard et al. | |
| 7,102,318 B2 | 9/2006 | Miura et al. | |
| 7,116,070 B2 | 10/2006 | MacKay | |
| 7,135,827 B1 | 11/2006 | Lampson | |
| 2003/0137273 A1 | 7/2003 | Davidov | |

* cited by examiner

*Primary Examiner* — Bentsu Ro
*Assistant Examiner* — David S Luo
(74) *Attorney, Agent, or Firm* — James J. McGroary; Peter J. Van Bergen

(57) ABSTRACT

A method and system are provided for sensing the position of a rotor in a hybrid stepper motor. First and second Hall sensors are positioned in a spaced-apart relationship with the first and second armatures of the rotor such that the first and second Hall sensors generate electrical outputs that are 90° out of phase with one another as the rotor rotates. The electrical outputs are adjusted relative to a reference, and the amplitude of the electrical outputs is further adjusted to account for spacing differences between the rotor and each of the first and second Hall sensors.

11 Claims, 4 Drawing Sheets

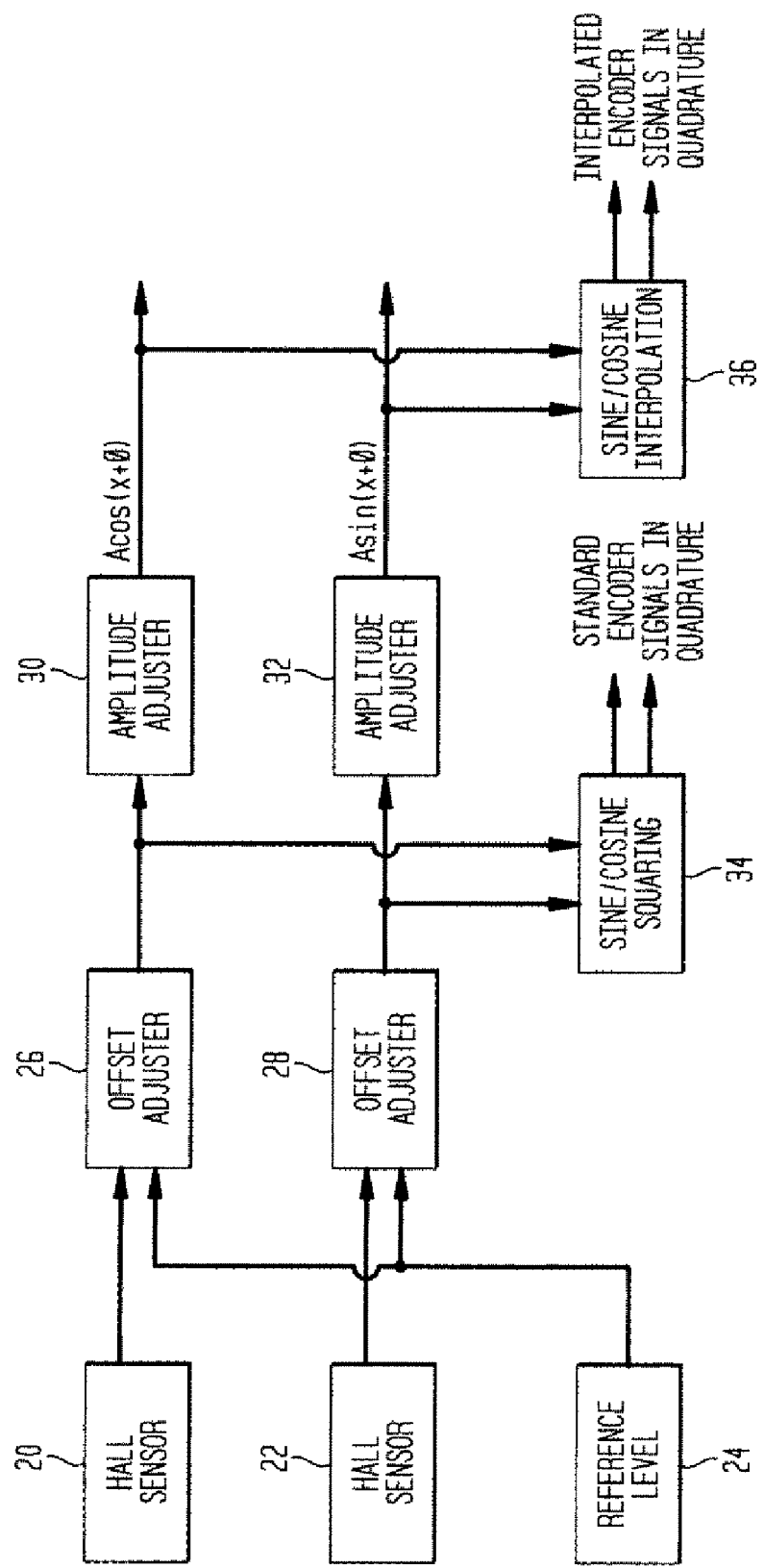

POSITION SENSING FOR ROTOR IN HYBRID STEPPER MOTOR

The invention described herein was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to methods and systems for sensing rotor position. More specifically, the invention is a position sensing system and method for sensing the position of a rotor in hybrid stepper motor.

2. Description of the Related Art

Stepper motors are used in a wide variety of machines to provide digital control of moving parts. However, typical stepper motors exhibit several undesirable characteristics. Principal among these characteristics are: insufficient resolution due to a relatively low number of steps per revolution (e.g., 200 steps per motor revolution); a high ripple torque; and a high constant internal power dissipation regardless of motor load. While the resolution and ripple torque problems can be addressed by providing high resolution motor command signals, the problem of constant internal power dissipation has been a continuing source of power loss.

The internal power dissipation of stepper motor is a function of motor current I and the resistance R of a motor winding. Accordingly, if the stepper motor is driven by a constant current source, power dissipation (or $I^2R$) will remain constant regardless of the load on the stepper motor.

As a result, the stepper motor generates heat associated with the fully-loaded condition even when the motor is only lightly-loaded. The unnecessary production and build-up of heat can be detrimental to the motor itself as well as surrounding components.

U.S. Pat. No. 6,013,999 discloses a stepper motor control system that reduces internal power dissipation losses. The system includes Hall position sensors that produce position feedback signals which are sine and cosine waveforms of the form $A \sin(X+\theta)$ and $A \cos(X+\theta)$, respectively, that are in phase with the back "electromagnetic force" (emf) of the stepper motor. The system is designed to work with brushless servo stepper motors that use a rotor having alternating north and south poles. The position sensors are placed at positions relative to the motor's stator. More specifically, the $\sin(X+\theta)$ signal is measured at a position that is located 90 electrical degrees away from one stator winding while the $\cos(X+\theta)$ signal is measured at a position located 90 electrical degrees away from another stator winding.

The above-described type of position sensing only works well for a rotor having alternating north/south pole pairs. That is, it does not work for another prevalent type of stepper motor known as a hybrid stepper motor. The rotor of a conventional hybrid stepper motor is illustrated in FIG. 1 and is referenced generally by numeral 10. Briefly, rotor 10 has armatures 12 and 14 mounted on a shaft 16 in a spaced-apart fashion. Each of armatures 12 and 14 is typically made from a magnetic or magnetizable material (e.g., soft iron). One armature (e.g., armature 12) defines north pole "steps" at its radial perimeter while the other armature (e.g., armatures 14) defines south pole steps at its radial perimeter. Since the rotor does not have alternating north and south poles, the positioning sensing approach disclosed in U.S. Pat. No. 6,013,999 cannot produce the required $A \sin(X+\theta)$ and $A \cos(X+\theta)$ position signals.

SUMMARY OF THE INVENTION

Accordingly, it is an object of the present invention to provide a system for sensing rotor position in a hybrid-type stepper motor.

Another object of the present invention is to provide system that can produce rotor position signals of the form $A \sin(X+\theta)$ and $A \cos(X+\theta)$ for a hybrid stepper motor.

Other objects and advantages of the present invention will become more obvious hereinafter in the specification and drawings.

In accordance with the present invention, a method and system are provided for sensing the position of a rotor in a hybrid stepper motor. The rotor has first and second spaced-apart armatures with the first armature defining a plurality of north poles and the second armature defining a plurality of south poles. First and second Hall sensors are positioned in a spaced-apart relationship with the first and second armatures of the rotor such that the first and second Hall sensors generate electrical outputs that are 90° out of phase with one another as the rotor rotates. The electrical outputs are adjusted relative to a reference, and the amplitude of the electrical outputs is adjusted to account for spacing differences between the rotor and each of the first and second Hall sensors.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein:

FIG. 7 is a block diagram of the position sensing electronics in accordance with the present invention.

DESCRIPTION OF THE PREFERRED EMBODIMENT(S)

Figure 1:
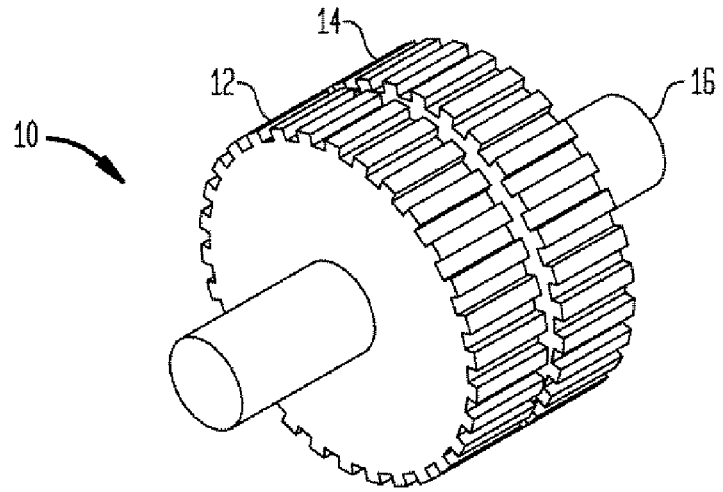
FIG. 1 is an isolated perspective view of a conventional rotor used in a hybrid-type stepper motor.

The present invention is a position sensing system that determines the position of a rotor in a hybrid-type stepper motor. The essential elements of the present invention are two Hall sensors positioned in proximity to the hybrid-type stepper motor rotor, and signal conditioning electronics that adjust the raw outputs of the two Hall sensors to produce position signals of the form $A \sin(X+\theta)$ and $A \cos(X+\theta)$. FIGS. 2-6 illustrate a number of possible positioning scenarios for the Hall sensors and FIG. 7 illustrates the position sensing electronics to include the Hall sensors and signal conditioning elements coupled thereto.

Referring first to FIGS. 2-6, the positioning possibilities for two Hall sensors 20 and 22 relative to hybrid-type stepper motor rotor 10 are illustrated. In each embodiment, rotor 10 is typical for a conventional hybrid-type stepper motor. That is, rotor 10 has spaced-apart armatures 12 and 14 mounted on a shaft 16 with armature 12 defining north pole steps at its radial perimeter and armature 14 defining south pole steps at its radial perimeter. Such rotor constructions are well understood in the art. Note that the spacing between armatures 12 and 14 is exaggerated for purpose of illustration.

Figure 2:
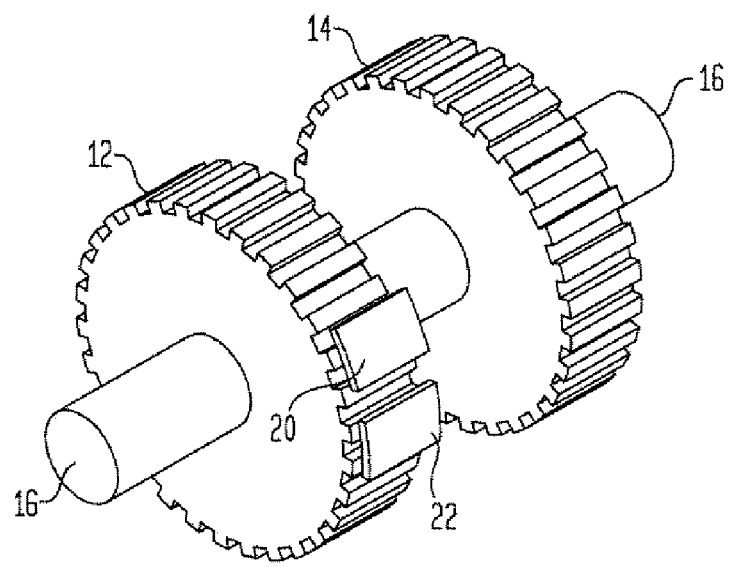
FIG. 2 is an isolated perspective view of a hybrid-type stepper motor rotor having two Hall sensor's spaced radially from the rotor's north pole armature in accordance with an embodiment of the present invention.

In FIG. 2, Hall sensors 20 and 22 are spaced radially from north pole armature 12, and are positioned relative to north pole armature 12 such that the electrical outputs of Hall sensors 20 and 22 are 90° out of phase with one another as rotor 10 rotates. Accordingly and as would be understood in the art, there can be a number of positions for Hall sensors 20 and 22 (relative to north pole armature 12) that will achieve 90° phasing between the electrical outputs.

Figure 3:
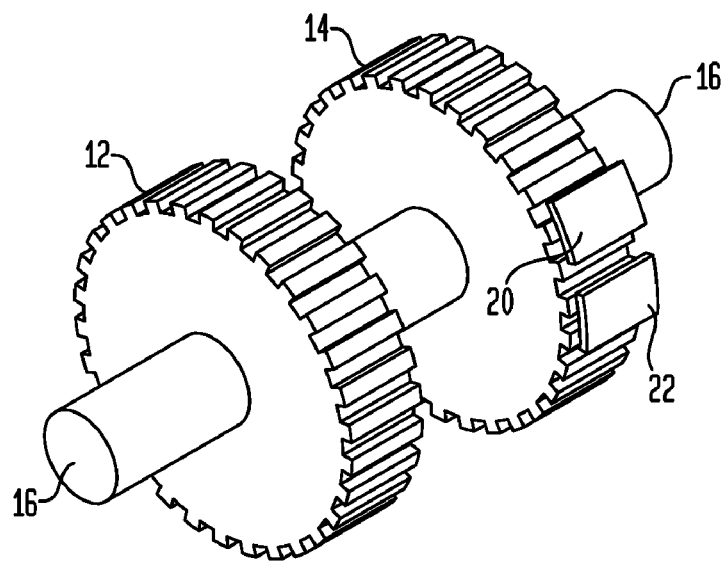
FIG. 3 is an isolated perspective view of a hybrid-type stepper motor rotor having two Hall sensors spaced radially from the rotor's south pole armature in accordance with another embodiment of the present invention.

In FIG. 3, Hall sensors 20 and 22 are spaced radially from south pole armature 12. Similar to the previous embodiment, Hall sensors 20 and 22 are also positioned relative to one another such that their electrical outputs will be 90° out of phase with one another as rotor 10 rotates.

Figure 4:
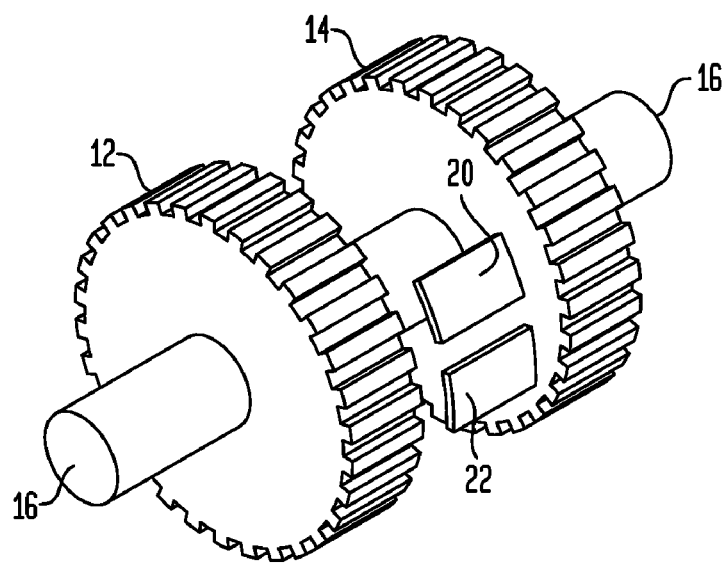
FIG. 4 is an isolated side view of a hybrid-type stepper motor rotor having two Hall sensors centrally positioned relative to the rotor's north and south pole armatures in accordance with another embodiment of the present invention.

In FIG. 4, Hall sensors 20 and 22 are also spaced radially from armatures 12 and 14. However, in this embodiment, each of Hall sensors 20 and 22 evenly straddles the center of the gap between armatures 12 and 14. Once again, Hall sensors 20 and 22 are positioned relative to one another such that their electrical outputs will be 90° out of phase with one another as rotor 10 rotates.

Figure 5:
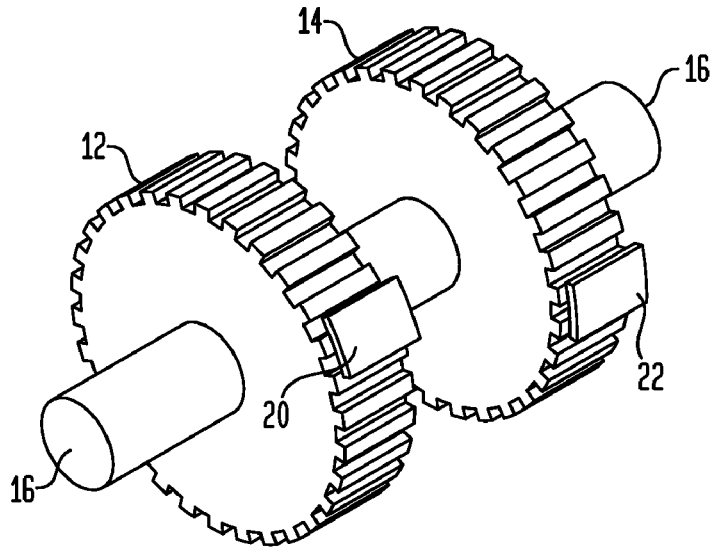
FIG. 5 is an isolated perspective view of a hybrid-type stepper motor rotor having one Hall sensor spaced radially from the rotor's north pole armature and the second Hall sensor spaced radially from the south pole armature.

In FIG. 5, Hall sensor 20 is spaced radially from north pole armature 12 while Hall sensor 22 is spaced radially from south pole armature 14. Once again, Hall sensors 20 and 22 are positioned relative to one another such that their electrical outputs will be 90° out of phase with one another as rotor 10 rotates.

Figure 6:
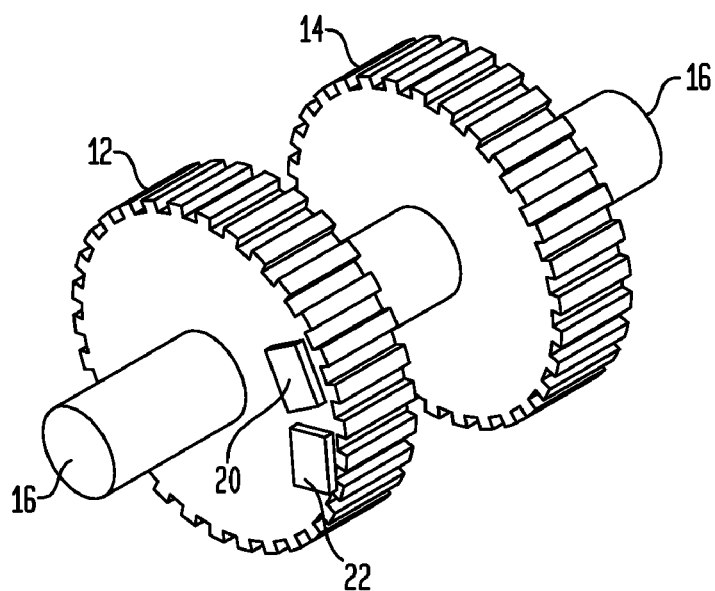
FIG. 6 is an isolated perspective view of a hybrid-type stepper motor rotor having two Hall sensors spaced axially from the rotor's north pole armature in accordance with another embodiment of the present invention.

Still another embodiment is shown in FIG. 6 where Hall sensors 20 and 22 are spaced axially from the periphery of north pole armature 12. Another option that is not shown is to similarly place/space the Hall sensors axially from the periphery of south pole armature 14. As in the previous embodiments, Hall sensors 20 and 22 are positioned relative to one another such that their electrical outputs will be 90° out of phase with one another rotor 10 rotates.

Regardless of which Hall sensor positioning scenario is used, the present invention will use the same signal conditioning electronics that are illustrated in FIG. 7. Using any of the above-described sensor position scenarios, the raw output of Hall sensor 20 is of the form $K_1 \cos(X+\theta)+y$ and the raw output of Hall sensor 22 is of the form $K_2 \sin(X+\theta)+z$ where X is equal to $(N \times \Phi)$ where N is the number of rotor poles and $\Phi$ is the mechanical angle of the rotor, $\theta$ is the phase or electrical angle between the commanded and actual rotor position, $K_1$ is the amplitude of Hall sensor 20, $K_2$ is the amplitude of Hall sensor 22, y is the bias or offset of the raw output of Hall sensor 20 relative to a reference level 24 (e.g., an electrical ground potential), and z is the bias or offset of the raw output of Hall sensor 22 relative to reference level 24.

In an ideal configuration, Hall sensors 20 and 22 are identically spaced or "gapped" with respect to rotor 10 so that $K_1$ would equal $K_2$ and y would equal z. However, this will never be the case in a real-world system since the spacing between Hall sensors 20 and 22 and rotor 10 can be different due to one or more of the following: initial positioning error, limitations of manufacturing processes, movement due to motor vibrations, etc. Accordingly, the present invention provides for a series of adjustments to the raw electrical outputs of Hall sensors 20 and 22. The first adjustment is performed by offset adjusters 26 and 28 where offset adjuster 26 zeroes the y bias associated with Hall sensor 20 and offset adjuster 28 zeroes the z bias associated with Hall sensor 22. The amount of offset in each case will be relative to reference level 24.

The outputs generated by offset adjusters 26 and 28 are of the form $K_1 \cos(X+\theta)$ and $K_2 \sin(X+\theta)$, respectively. Accordingly, amplitude adjusters 30 and 32 in the form of multipliers are placed in the circuit such that the electrical outputs thereof are of the form $A \cos(X+\theta)$ and $A \sin(X+\theta)$, respectively. Thus, the outputs produced by (i) the combination of Hall sensor 20/offset adjuster 26/amplitude adjuster 30, and (ii) the combination of Hall sensor 22/offset adjuster 28/amplitude adjuster 32 form position signals of rotor 10.

It is to be understood that the order of adjusters 26/30 and 28/32 is not a limitation of the present invention. Further, the function of the two adjusters could be combined in a single electronics package as would be understood by one of ordinary skill in the art. Still further, the functions of the adjusters can be implemented by a variety of analog and/or digital circuitry without departing from the scope of the present invention.

The interim and ultimate signals produced by the present invention can be used in other ways. For example, the outputs of offset adjusters 26 and 28 could be supplied to sine/cosine squaring circuitry 34 which can generate standard encoder signals in quadrature. Such processing is well known in the art. Encoder signals in quadrature can be generated with greater precision if the outputs of adjusters 30 and 32 are used. More specifically, sine/cosine interpolation circuitry 36 can be used to more precisely generate (squared) encoder signals in quadrature. Such interpolation processing is also well known in the art.

The advantages of the present invention are numerous. The position sensing system provides rate-insensitive position signals for a hybrid-type stepper motor rotor. The position signals can then be used in a stepper motor control system. The system can provide incremental position signals or the sine/cosine waves can be interpolated to provide more accurate encoder outputs.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for sensing the position of a rotor in a hybrid stepper motor wherein the rotor has first and second spaced-apart armatures with the first armature defining a plurality of north poles at a radial perimeter thereof and the second armature defining a plurality of south poles at a radial perimeter thereof, said system comprising:

first and second Hall sensors adapted to be mounted in a spaced-apart relationship and in direct opposition to the radial perimeter of at least one of the first and second armatures of the rotor, said first and second Hall sensors positioned to generate electrical outputs that are 90° out of phase with one another as the rotor rotates; and means coupled to said first and second Hall sensors for adjusting said electrical outputs relative to a reference and for adjusting amplitude of said electrical outputs to account for spacing differences between the rotor and each of said first and second Hall sensors.

2. A system as in claim 1 wherein both said first and second Hall sensors are adapted to be spaced in direct opposition to the radial perimeter of just the first armature.

3. A system as in claim 1 wherein both said first and second Hall sensors are adapted to be spaced in direct opposition to the radial perimeter of just the second armature.

4. A system as in claim 1 wherein said first Hall sensor is adapted to be spaced in direct opposition to the radial perimeter of the first armature and said second Hall sensor is adapted to be spaced in direct opposition to the radial perimeter of the second armature.

5. A system as in claim 1 wherein said reference is an electrical ground potential.

6. A system as in claim 1 further comprising converting means coupled to said means for adjusting for converting said electrical outputs so-adjusted to encoder signals in quadrature.

7. A method of sensing the position of a rotor in a hybrid stepper motor wherein the rotor has first and second spaced-apart armatures with the first armature defining a plurality of north poles at a radial perimeter thereof and the second armature defining a plurality of south poles at a radial perimeter thereof, said method comprising the steps of:

positioning first and second Hall sensors in a spaced-apart relationship and in direct opposition to the radial perimeter of at least one of the first and second armatures of the rotor such that said first and second Hall sensors generate electrical outputs that are 90° out of phase with one another as the rotor rotates;

adjusting said electrical outputs relative to a reference; and adjusting amplitude of said electrical outputs to account for spacing differences between the rotor and each of said first and second Hall sensors.

8. A method according to claim 7 wherein said step of positioning comprises the step of spacing both said first and second Hall sensors in direct opposition to the radial perimeter of just one of the first armature and the second armature.

9. A method according to claim 8 wherein said step of positioning comprises the steps of:

spacing said first Hall sensor in direct opposition to the radial perimeter of the first armature; and spacing said second Hall sensor in direct opposition to the radial perimeter of the second armature.

10. A method according to claim 8 wherein said reference is an electrical ground potential.

11. A method according to claim 8 further comprising the step of converting said electrical outputs so-adjusted to encoder signals in quadrature.

\* \* \* \* \*